United States Patent
Rasmussen et al.

(10) Patent No.: US 8,943,864 B2
(45) Date of Patent: Feb. 3, 2015

(54) PROPORTIONAL TORQUE SHAFT CLUTCH ASSEMBLY

(75) Inventors: Terry D. Rasmussen, Payson, UT (US); Richard C. O'Neal, Payson, UT (US)

(73) Assignee: Liberty Safe and Security Products, Inc., Payson, UT (US)

( * ) Notice: Subject to any disclaimer, the term of this patent is extended or adjusted under 35 U.S.C. 154(b) by 1046 days.

(21) Appl. No.: 12/749,120

(22) Filed: Mar. 29, 2010

(65) Prior Publication Data

US 2011/0174587 A1 Jul. 21, 2011

Related U.S. Application Data

(60) Provisional application No. 61/296,020, filed on Jan. 18, 2010.

(51) Int. Cl.
*E05B 15/16* (2006.01)
*F16C 3/00* (2006.01)
*F16D 1/097* (2006.01)
*F16D 1/08* (2006.01)
*F16D 7/02* (2006.01)

(52) U.S. Cl.
CPC .............. *F16D 1/097* (2013.01); *F16D 1/0847* (2013.01); *F16D 7/025* (2013.01)
USPC ................ 70/222; 70/379 R; 70/380; 70/422; 292/336.5

(58) Field of Classification Search
USPC ....... 70/222–224, 379 R, 380, 422, 467, 472, 70/473; 292/336.3, 336.5, 347, 348, 350
See application file for complete search history.

(56) References Cited

U.S. PATENT DOCUMENTS

| | | | | |
|---|---|---|---|---|
| 1,668,403 | A | * 5/1928 | Haven | 70/221 |
| 1,671,521 | A | * 5/1928 | Fisher | 192/56.5 |
| 4,312,201 | A | 1/1982 | Roos | |
| 4,550,581 | A | 11/1985 | Best et al. | |
| 4,679,420 | A | 7/1987 | Yang | |
| 5,010,755 | A | * 4/1991 | Best | 70/422 |
| 5,040,652 | A | * 8/1991 | Fish et al. | 70/189 |
| 5,245,846 | A | * 9/1993 | James | 70/118 |
| 5,619,874 | A | 4/1997 | Myers | |
| 5,651,280 | A | 7/1997 | Park | |
| 5,664,448 | A | * 9/1997 | Swan et al. | 70/224 |
| 5,730,014 | A | 3/1998 | Berger et al. | |

(Continued)

*Primary Examiner* — Christopher Boswell
(74) *Attorney, Agent, or Firm* — Thorpe North & Western LLP

(57) ABSTRACT

A system for securing a cam of a locking mechanism to a rotatable shaft, which comprises a cam for actuating a locking mechanism and a clutch that includes, in part, a sleeve body having a distal end affixed to a face of the cam and a sleeve bore having a tapered sleeve journal and a sleeve screw portion with internal threads opposite the sleeve journal. The clutch also includes a collet that is installed within the sleeve bore and which has a collet nut extending outwardly from a proximal end of the sleeve bore, a collet bore, and an outer surface having an axially-split and tapered collet journal abutting the sleeve journal and a collet screw portion with external threads engaged with the sleeve screw portion. The system further includes a rotatable shaft that is secured within the collet bore with a break-away torque that is proportional to an assembly torque applied to the collet nut. After assembly of the clutch to both the cam and the rotatable shaft, a drive torque applied to the shaft which is less than the break-away torque causes the cam to rotate with the shaft, while a drive torque that is greater than the break-away torque causes the shaft to spin within the collet bore.

20 Claims, 5 Drawing Sheets

(56) References Cited

U.S. PATENT DOCUMENTS

| | | |
|---|---|---|
| 5,732,580 A * | 3/1998 | Garnault et al. ............... 70/422 |
| 5,768,926 A | 6/1998 | Shen |
| 5,787,743 A | 8/1998 | Weigard |
| 5,787,744 A | 8/1998 | Berger et al. |
| 6,474,248 B1 * | 11/2002 | Stark et al. .................... 70/221 |
| 6,527,314 B2 | 3/2003 | Brown |
| 6,786,519 B2 * | 9/2004 | Gartner ........................ 292/195 |
| 7,591,158 B2 * | 9/2009 | Konno et al. .................. 70/252 |
| 7,966,854 B2 * | 6/2011 | Imedio Ocana ............... 70/472 |

\* cited by examiner

Section A-A

PROPORTIONAL TORQUE SHAFT CLUTCH ASSEMBLY

RELATED APPLICATIONS

This application claims the benefit of U.S. Provisional Patent Application No. 61/296,020, filed Jan. 18, 2010, and entitled "Proportional Torque Shaft Clutch Assembly," which application is incorporated by reference in its entirety herein.

FIELD OF THE INVENTION

The field of the invention relates generally to locking mechanisms for doors, and more specifically for locking mechanisms used to actuate the pin-bar assemblies installed into the doors of high-security enclosures such as safes.

BACKGROUND OF THE INVENTION AND RELATED ART

When securing the door of a safe or other security enclosure, it is important to ensure that each possible method for opening the safe is guarded against unauthorized entry. In attempts to accomplish this, numerous different methods have been developed for ensuring that the door of the safe may not be easily opened, as the door is often the most vulnerable portion of the safe. If a burglar, thief or vandal is able to pry the door of the safe open, the structural integrity of the remainder of the safe or security enclosure becomes irrelevant. In attempts to overcome this concern, numerous arrangements have been made which cause a plurality of locking bolts or pins to extend from one or more sides of the door and into the remainder of the safe so as to prevent the door from being opened by prying, punching or some other externally-applied force.

While the use of locking bolts improves the security of the door, the present arrangements for engaging the locking bolts often provide insufficient protection, are difficult to operate, or are overly expensive. Other systems provide adequate protection, but are needlessly complex and have numerous moving parts which interact together in a rough or inefficient manner. If the parts fail, moreover, the owner of the safe may be unable to retrieve his or her belongings without unnecessary delay and the possibility of destroying the safe.

Thus, a need continues to exist for simple, efficient and more cost-effective locking mechanisms and methods for engaging the locking bolts on a safe door with the remainder of the safe. Such mechanisms would minimize the number of moving parts and improve their efficiency and smoothness during operation while continuing to provide secure protection against the door of the safe being opened without authorization.

SUMMARY OF THE INVENTION

In accordance with one representative embodiment described herein, a system is provided for securing a cam of a locking mechanism to a rotatable shaft, which system comprises a cam for actuating a locking mechanism and a clutch that includes, in part, a sleeve body having a distal end affixed to a face of the cam and a sleeve bore having a tapered sleeve journal and a sleeve screw portion with internal threads opposite the sleeve journal. The clutch also includes a collet that is installed within the sleeve bore, and which has a collet nut extending outwardly from a proximal end of the sleeve bore, a collet bore, and an outer surface having an axially-split and tapered collet journal abutting the sleeve journal, and a collet screw portion with external threads engaged with the sleeve screw portion. The system further comprises a rotatable shaft that is secured within the collet bore with a break-away torque that is proportional to an assembly torque applied to the collet nut. Upon assembly, a drive torque applied to the shaft which is less than the break-away torque causes the cam to rotate with the shaft, while a drive torque that exceeds the break-away torque causes the shaft to spin within the collet bore.

In accordance with another representative embodiment described herein, a system is provided for securing a cam of a locking mechanism to a rotatable shaft, which system comprises a cam for actuating a locking mechanism and a clutch that includes, in part, a sleeve body having a distal end affixed to a face of the cam and a sleeve bore having a tapered sleeve journal adjacent the cam and a sleeve screw portion with internal threads opposite the sleeve journal. The clutch also includes a threaded collet inserted within the sleeve bore having a collet bore and an outer surface having an axially-split and tapered collet journal abutting the sleeve journal, a collet nut opposite the collet journal and extending outwardly from a proximal end of the sleeve bore, and a collet screw portion with external threads between the collet nut and the collet journal and engaged with the sleeve screw portion. The system further comprises a rotatable shaft secured within the collet bore with a break-away torque proportional to an assembly torque applied to the collet nut. Upon assembly, a drive torque applied to the shaft that is less than the break-away torque causes the cam to rotate with the shaft, and a drive torque that is greater than the break-away torque causes the shaft to spin within the collet bore.

In accordance with yet another representative embodiment described herein, a method is provided for securing a cam of a locking mechanism to a rotatable shaft, which method includes the step of affixing a distal end of a sleeve body to a face of the cam, wherein the sleeve body has a sleeve bore that includes a tapered sleeve journal and a sleeve screw portion with internal threads opposite the sleeve journal. The method also includes the step of installing a collet into the sleeve bore, wherein the collet has a collet nut extending outwardly from a proximal end of the sleeve bore, a collet bore, and an outer surface that comprises an axially-split and tapered collet journal abutting the sleeve journal, and a collet screw portion with external threads engaged with the sleeve screw portion. The method further includes the steps of inserting a rotatable shaft into the collet bore, and applying an assembly torque to the collet nut to secure the collet to the sleeve body and the rotatable shaft to the collet with a break-away torque that is proportional to the assembly torque. After assembly, a drive torque applied to the shaft that is less than the break-away torque causes the cam to rotate with the shaft, while a drive torque that is greater than the break-away torque causes the shaft to spin within the collet bore.

BRIEF DESCRIPTION OF THE DRAWINGS

Features and advantages of the present invention will be apparent from the detailed description that follows, and when taken in conjunction with the accompanying drawings together illustrate, by way of example, features of the invention. It will be readily appreciated that these drawings merely depict representative embodiments of the present invention and are not to be considered limiting of its scope, and that the components of the invention, as generally described and illustrated in the figures herein, could be arranged and designed in a variety of different configurations. Nonetheless, the present invention will be described and explained with additional specificity and detail through the use of the accompanying drawings, in which:

FIG. 4 is a side view of the sleeve body of the proportional torque shaft clutch assembly of FIG. 2a;

FIG. 5 is a side view of the collet of the proportional torque shaft clutch assembly of FIG. 2a;

FIGS. 6a and 6b together illustrate the side and cross-sectional views of the assembled proportional torque shaft clutch assembly of FIG. 2a;

DETAILED DESCRIPTION OF EXEMPLARY EMBODIMENTS

The following detailed description makes reference to the accompanying drawings, which form a part thereof and in which are shown, by way of illustration, various representative embodiments in which the invention can be practiced. While these embodiments are described in sufficient detail to enable those skilled in the art to practice the invention, it should be understood that other embodiments can be realized and that various changes can be made without departing from the spirit and scope of the present invention. As such, the following detailed description is not intended to limit the scope of the invention as it is claimed, but rather is presented for purposes of illustration, to describe the features and characteristics of the representative embodiments, and to sufficiently enable one skilled in the art to practice the invention. Accordingly, the scope of the present invention is to be defined solely by the appended claims.

Furthermore, the following detailed description and representative embodiments of the invention will best understood with reference to the accompanying drawings, wherein the elements and features of the embodiments are designated by numerals throughout.

Illustrated in FIGS. 1-9 are several representative embodiments of a proportional torque shaft clutch assembly, which embodiments also include various methods of securing a cam of a locking mechanism to a rotatable shaft. As described herein, the shaft clutch assembly provides several significant advantages and benefits over other devices and methods for coupling the cam of a locking mechanism to a rotatable shaft. However, the recited advantages are not meant to be limiting in any way, as one skilled in the art will appreciate that other advantages may also be realized upon practicing the present invention.

Figure 1:
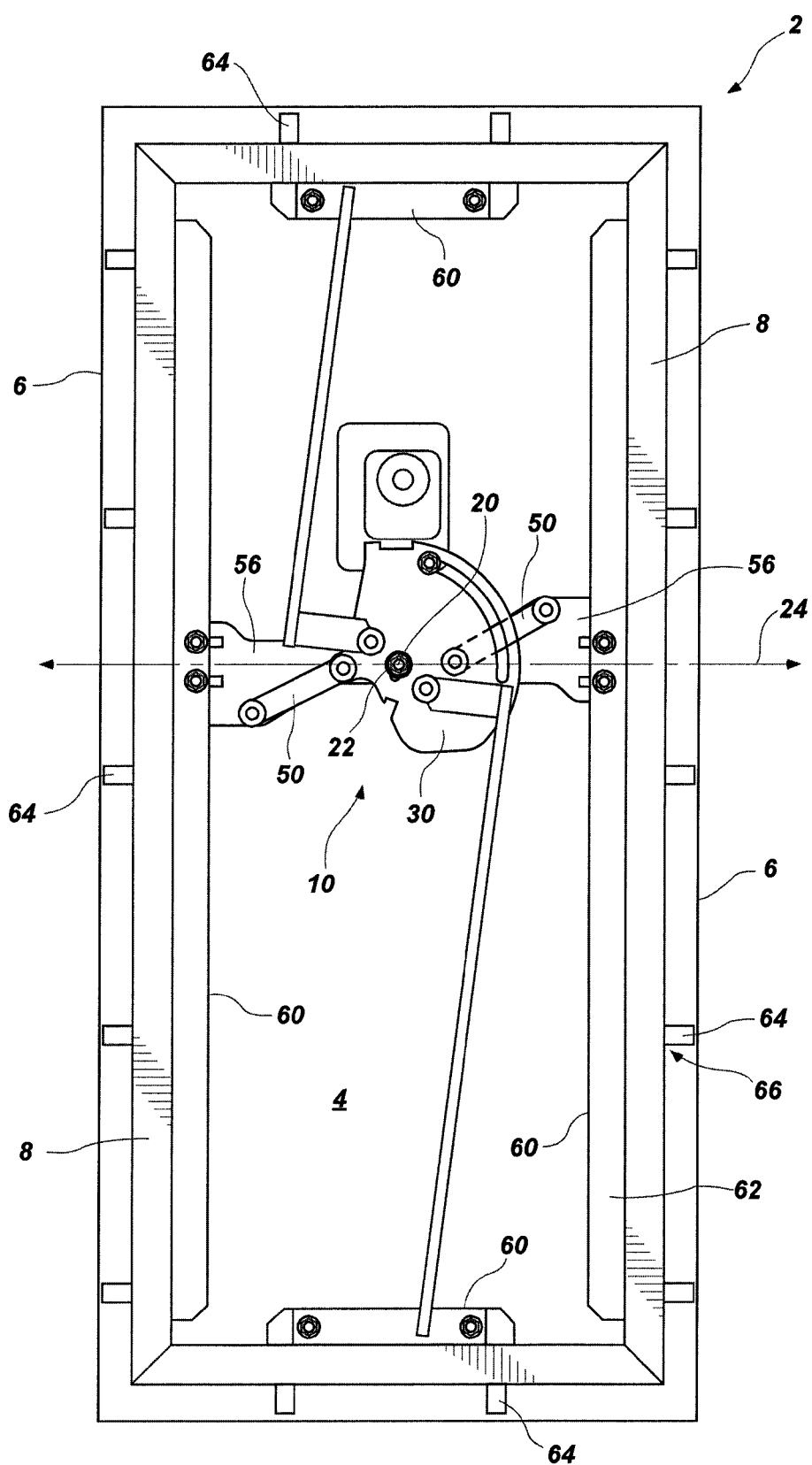
FIG. 1 illustrates a door of a security enclosure having a locking mechanism.

FIG. 1 shows a representative locking mechanism 10 mounted to the inside surface of a door 2 of a safe or security enclosure (not shown). The door 2 can have a perimeter frame 8 adjacent the outer edges 6 of the door which provide both structural support for the door panel 4 and attachment points for hinges which can attach the door to the body of the safe or security enclosure. The perimeter frame 8 and panel 4 of the door can be configured to fit tightly within a door frame (not shown) of the safe when closed, so as to prevent the insertion of objects between the door and the door frame which could be used to pry the two apart, and to restrict or eliminate the transfer of heat or air between the surrounding environment and the interior of the safe.

The perimeter frame 8 of the door 2 can further include locking pin apertures 66 that are periodically spaced along one or more side edges of the door, and which slidably support the plurality of locking pins 64 extending from the pin-bar assemblies 60. As shown in FIG. 1, for example, each horizontally-actuated pin-bar assembly that is located adjacent a vertical side edge of the door 2 can include five locking pins 64 which extend outwardly from the vertically-oriented pin bar bracket 62. Other locking mechanism configurations having different pin-bar assembly arrangements with alternatively-designed pin-bar brackets and/or a varying number of locking pins extending therefrom are also possible.

The depth of the perimeter frame 8 of the door 2 relative to the door frame of the safe or security enclosure can be arranged so that the locking pins 64 are located interior to an inside perimeter edge (not shown) of the door frame when the door 2 is in the closed position. As will be understood by one of skill in the art, actuating the pin-bar assemblies 60 with the locking mechanism 10 can extend the locking pins radially outward behind the inside perimeter edge of the door frame to lock the safe and prevent the door from opening.

Figure 2:
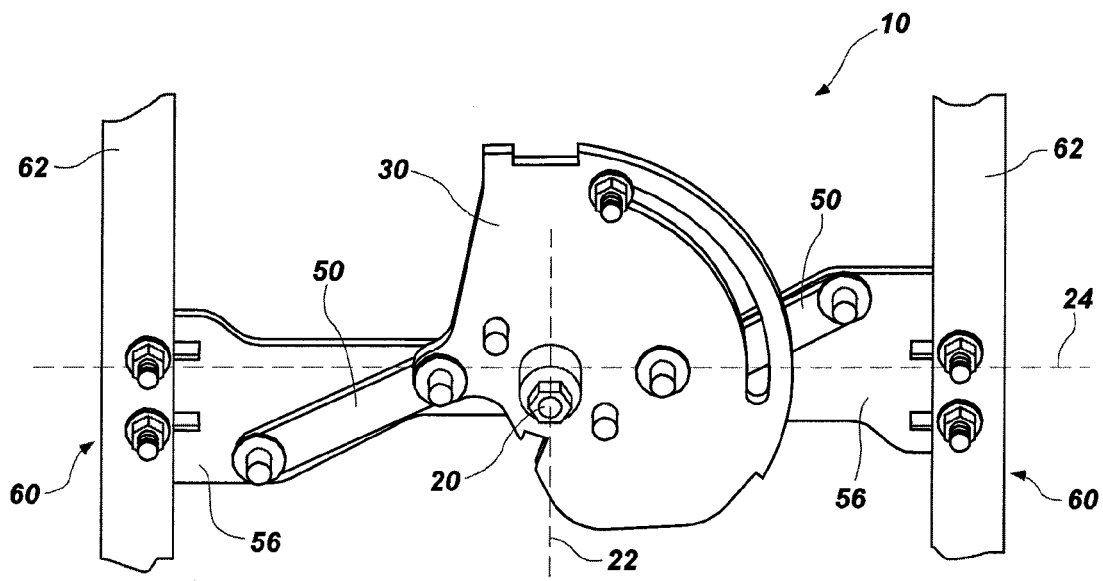
FIG. 2 is a perspective view of a locking mechanism having a proportional torque shaft clutch assembly, in accordance with one representative embodiment.
Figure 3:
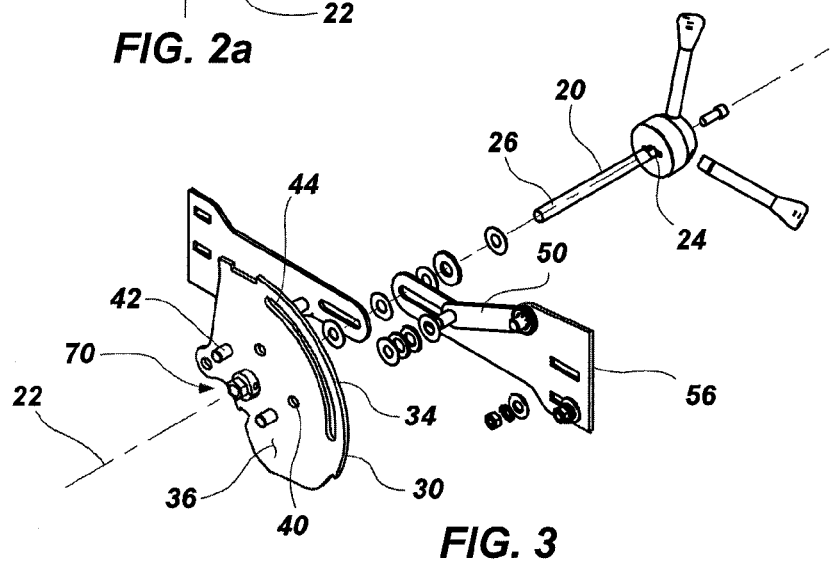
FIG. 3 is an exploded assembly view of the locking mechanism of FIG. 2.

As shown in more detail in FIGS. 2 and 3, the locking mechanism 10 includes a rotatable shaft 20 that is mounted to or through the door and which has an axis of rotation 22, and a cam 30 that is mounted to the shaft in an orientation that is substantially-perpendicular to the axis of rotation, so that rotation of the shaft causes rotation of the cam. In one aspect, the locking mechanism can also include one or more horizontal actuator plates 56, with each actuator plate having a proximal end (e.g. closest to the axis of rotation) with a radial slot formed therein and installed about the rotatable shaft (hidden behind the cam in FIG. 1), and a distal end that is coupled to the locking pin bar assembly 60 which is slidably supported adjacent the outer side edge of the door by the perimeter frame, as described above.

The locking mechanism 10 can further include one or more linkage bars 50 which serve as the driving connection between the cam 30 and the actuator plate(s) 56. The linkage bars have a proximal end (e.g. closest to the axis of rotation) that is pivotably coupled to the cam at a radial distance from the axis of rotation, and a distal end that is pivotable coupled to a mid-span journal pin extending from the actuator plates 56, at a point between the radial slot at one end and one or more attachment slots are the other end. Moreover, the linkage bars 50 can convert the rotational motion of the cam 30 into the linear motion of the actuator plates 56. The pivoting connections at both ends of the linkage bar 50 can be created by smooth-surfaced journal pins either extending from the linkage bar and inserted into journal holes in the cam or actuator plates, or by journal holes formed into the linkage bar which receive journal pins mounted to the adjacent components.

In the representative locking mechanism 10 of FIGS. 1-3, the rotation of the rotatable shaft 20 and cam 30 causes the linkage bars 50 to drive the actuator plates 56 along a horizontal radial axis 24 and to engage or disengage the pin-bar assemblies 60 with the inside perimeter edge of the door frame. Referring back to FIG. 1, for instance, the cam 30 of the locking mechanism 10 can be rotated to its furthest clockwise rotation position to drive the actuator plates 56 and pin-bar assemblies 60 with the linkage bars 50 outwardly into an extended and locked position.

Figure 2A:
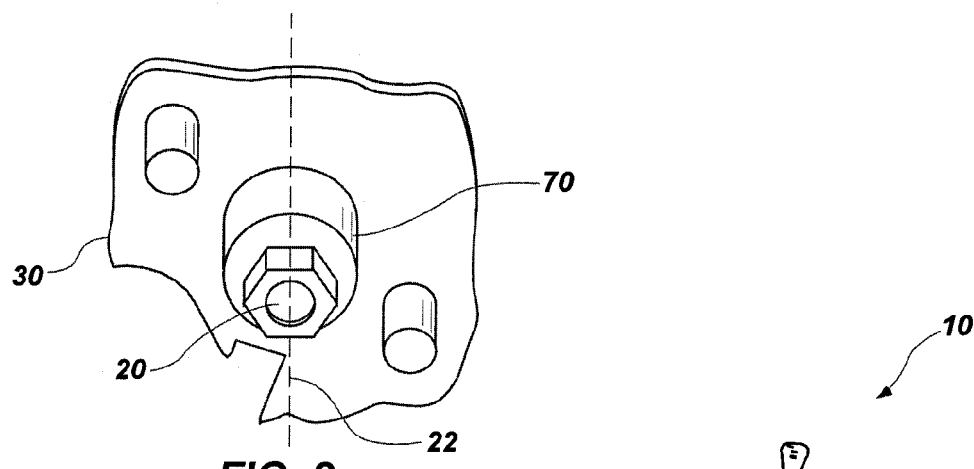
FIG. 2a is a close-up, perspective view of the proportional torque shaft clutch assembly of FIG. 2.

Additional details of the representative locking mechanism 10 are illustrated in FIG. 2a and the exploded assembly view provided in FIG. 3. For example, the drive shaft 20 has an axis of rotation 22, and can include a handle end 24 which projects through the door panel of the door (not shown), and which can be coupled to a door handle used to operate the locking mechanism. The cam end 26 of the drive shaft 20 can be coupled to the cam 30 with a coupling device, such as the proportional torque shaft clutch assembly 70 described herein. More specifically, the rotatable shaft 20 can be inserted from the front of the door through a clutch assembly aperture in the cam 30, and secured to the backside face 36 of the cam with the shaft clutch assembly 70, thus allowing more clearance for the linkage bars 50 and actuator plates 56 which can be attached to or suspended adjacent the frontside face.

As also shown in FIG. 3, diametrically-opposed journal holes 40 for journal pins extending from the proximal ends of the linkage bars 50 can be formed at a radial distance from the axis of rotation 22, while diametrically-opposed actuator pins 42 for vertical actuator bars can extend axially from the backside face 36 of the cam at a similar or different radial distance. Furthermore, an arc-segment slot 44 can also be formed adjacent a perimeter edge of the cam 34 for receiving a stationary pin (not shown) that is fixed to the door panel or to a non-moving portion of the locking mechanism or secondary locking device. The arc-segment slot 44 and the stationary pin can together provide a rotational stop for the cam 30, in one or both directions, to prevent the over-rotation or uncontrolled linear travel of the various moving parts of the locking mechanism 10.

Figure 4:
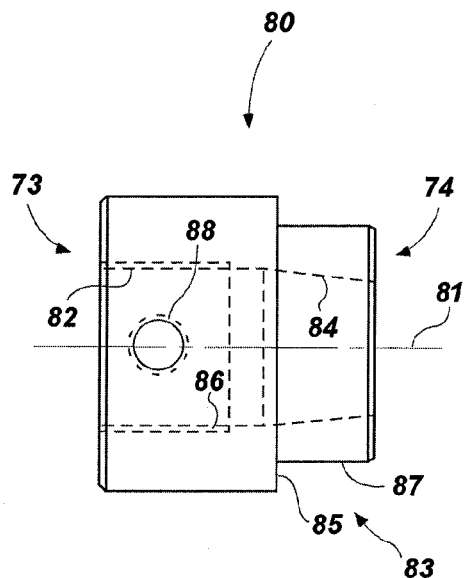
Figure 5:
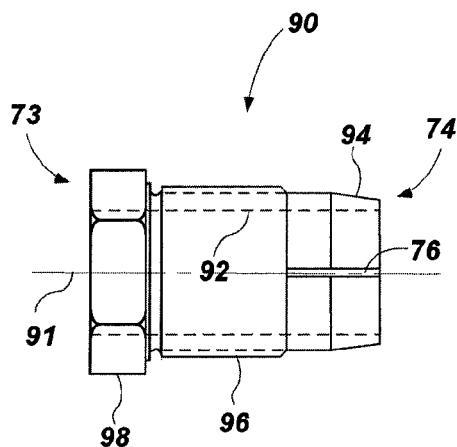

FIGS. 4 and 5 are isolated side views of the sleeve body 80 having an axial sleeve bore 82 and the collet 90 having an axial collet bore 92 which, when assembled, form the proportional torque shaft clutch 72. The sleeve can have a distal end 74 that is configured to be affixed to a face of the cam (not shown) and a proximal end 73 opposite the distal end. The collet can also have a distal end 74 and a proximal end 73, and is configured to be inserted within the bore of the sleeve 82 with a collet nut 98 extending outwardly from the proximal end of the sleeve bore.

As shown in FIG. 4, in one aspect the distal end 74 of the sleeve body 80 can include a stepped or rabbet fit 83 having a reduced-diameter section 87 which can be inserted into the clutch assembly aperture (not shown) formed at the centerline position of the cam, to center the sleeve body relative to the cam. The rabbet fit can also have an axial face section 85 that is formed perpendicular to the reduced-diameter section and which contacts the face of the cam, to aligned the sleeve body perpendicular to the plane of the cam. With the rabbet fit 83 inserted into the clutch assembly aperture to position and align the sleeve body to the cam, the sleeve body 80 can then be affixed to the cam using any one of a variety of methods known in the art, such as welding, brazing or metal-on-metal adhesives, etc., applied around the perimeter of the joint between the sleeve body and the cam. In other aspects the sleeve body can be affixed to the cam using an integrally-threaded joint formed into the reduced-diameter section 87, or similar attachment device.

The sleeve bore 82 includes a tapered sleeve journal 84 located at one end of the bore and a sleeve screw portion 86 with internal screw threads located at the other end of the bore, opposite the sleeve journal. With the sleeve body 80 shown in FIG. 4, the tapered sleeve journal 84 can be located proximate the distal end 74 of the sleeve body that is to be affixed to the cam. Moreover, the sleeve journal can taper inwardly towards a longitudinal centerline axis 81 when traversing from the proximal end 73 to the distal end 74 of the clutch adjacent the cam. The sleeve body 80 can further include a threaded set screw opening 88 through a sidewall of the sleeve, and which is configured to receive a set screw therein for locking the collet in a rotational position relative to the sleeve.

Referring now to FIG. 5, the collet 90 can include a substantially-smooth and uniform collet bore 92 formed along a longitudinal centerline axis 91 and having a diameter that is slightly greater than the diameter of the rotatable shaft, so that the rotatable shaft can freely slide into and rotate or spin within the collet bore during assembly. Furthermore, the outer surface features of the collet 90 can be configured to interface with the interior features of the sleeve bore 82, namely a tapered collet journal 94 which has substantially the same angle of taper as the sleeve journal 84, and a collet screw portion 96 with external threads that mate with and engage the internally-threaded sleeve screw portion 86 of the sleeve bore 82. The tapered journal 94 of the collet 90 is further distinguished from the tapered journal 84 of the sleeve 80, however, in that the collet journal 94 includes an axial split 76 of about five degrees in width that allows the journal portion of the collet to be displaced inwardly when pressed against the tapered sleeve journal.

Figure 6A:
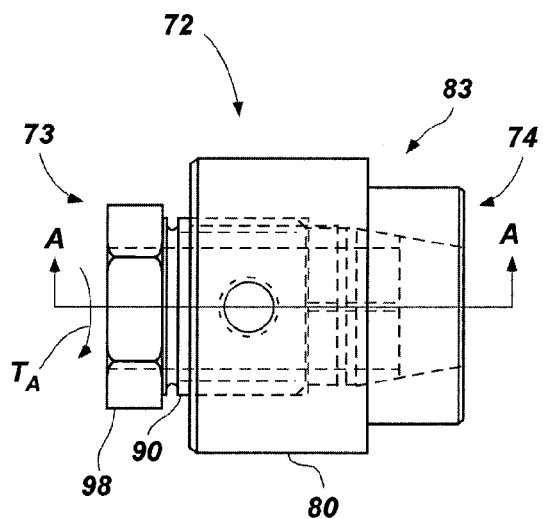
Figure 6B:
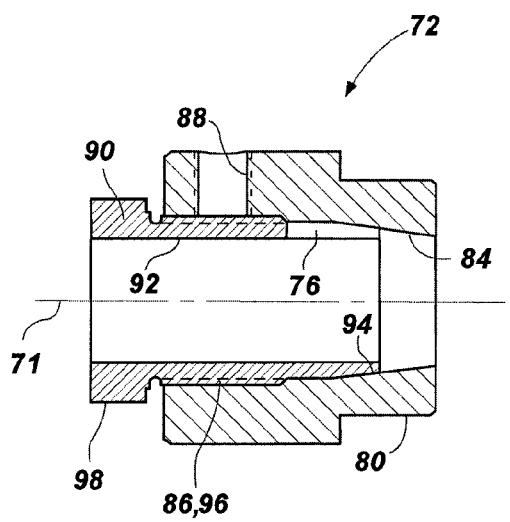

Thus, during the initial assembly of the shaft clutch 72, as shown in FIGS. 6a and 6b, the collect 90 can be inserted and threaded into the sleeve bore 82 until the tapered collet journal 94 abuts, but does not strongly press against the tapered sleeve journal 84. After this initial contact, continued rotation of the collet nut 98 with an assembly torque $T_A$ into a non-rotating or fixed sleeve body 80 forces the collet journal 94 against the sleeve journal 84 and compresses or displaces that portion of the collet bore 92 directly underneath the collet journal/sleeve journal interface inwardly and towards the longitudinal centerline axis 71 of the shaft clutch 72.

Figure 7:
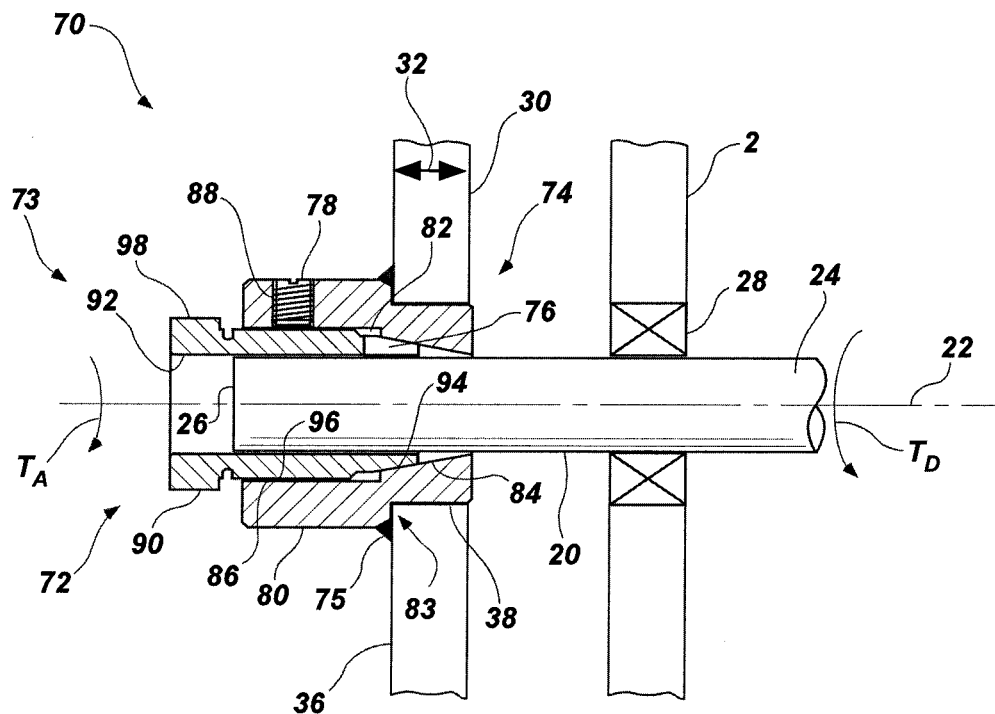
FIG. 7 is a cross-sectional view of the proportional torque shaft clutch assembly and locking mechanism of FIG. 2 installed into a door of a security enclosure.

Referring now to FIG. 7, if a rotatable shaft 20 is present with the collet bore 92 during application of the assembly torque $T_A$, the portion of the collet bore directly underneath or adjacent to the collet journal 94/sleeve journal 84 interface will compress inwardly around the circumference of the shaft, and pinch or grip the cam end 26 of the shaft with a friction-fit gripping force that is proportional to the assembly torque. Moreover, the gripping force is distributed around the entire circumference of the shaft and along a portion of the length to secure the rotatable shaft to the clutch (e.g. and the cam), and can be manifested as a break-away torque applied to the handle end 24 of the rotatable shaft 20. In other words, if a drive torque $T_D$ is applied to the handle end 24 of the shaft that is less than the break-away torque generated by the gripping force, the shaft 20, clutch 70 and the cam 30 will rotate together. However, if the drive torque $T_D$ is greater than the break-away torque, the shaft 20 will instead begin to slide and spin within the collet bore 92.

The benefits and advantages of having the handle and shaft rotate to actuate the locking mechanism of the safe or security enclosure when correctly operated, while automatically releasing the shaft 20 to spin within the collet bore 92 when over-torqued in either direction with an excessive drive torque $T_D$, may be readily be appreciated by one of skill in the art. For instance, using the proportional torque shaft clutch assembly 70 can prevent damage to the handle or to the shaft 20 if a thief or vandal were to continue to press on the handle in an attempt to force the locking mechanism from its locked position. Likewise, the shaft clutch assembly 70 could also prevent a user from unintentionally damaging the locking mechanism itself by continuing to apply a torque to the handle with the locking mechanism in its open position.

Also shown in FIG. 7, the stepped or rabbet fit 83 formed into the sleeve body 80 of the clutch 72 can be inserted into the clutch assembly aperture 38 formed through the thickness 32 of the cam 30, and the sleeve body can be affixed to the backside face 36 of the cam with one or more welds 75. The tapered sleeve journal 84 can be located proximate to the distal end 74 of the sleeve bore 82 and adjacent the cam 30. The sleeve journal 84 and collet journal 94 can be tapered inwardly towards the axis of rotation 22 of the rotatable shaft 20 (when traversing from a proximal end 73 to a distal end 74 of the clutch), and the collet screw portion 96 can be positioned between the collet nut 98 and the tapered collet journal 94. Thus, when the assembly torque $T_A$ is applied to the collet nut 98, the screw threads force the collet 90 towards the cam 30 and against the sleeve journal 84.

In one aspect the rotatable shaft 20 can have a handle end 24 which extends outwardly from the front face of the door 2 of the security enclosure, to which a handle can be attached. The shaft 20 can be supported with a bearing 28 as it passes through the door of the safe and enters the collet bore 92 of the shaft clutch assembly 70 from the opposite side, or front side, of the cam. After the cam end 26 of the rotatable shaft has been secured within the collet bore with the break-away torque proportional to an assembly torque $T_A$ applied to the collet nut 98, the collet 90 can be locked in its rotational position within the sleeve bore 82 by installing a set screw 78 or similar fastening device through a threaded opening 88 formed through a sidewall of the sleeve body 80.

Figure 8:
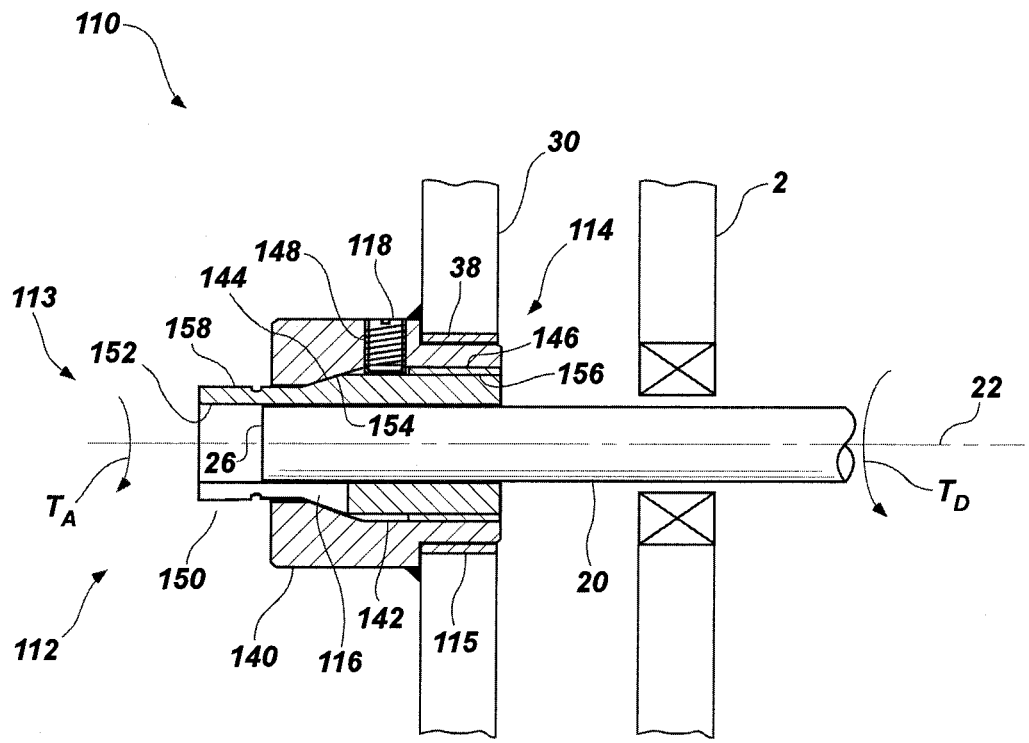
FIG. 8 is a cross-sectional view of a proportional torque shaft clutch assembly and locking mechanism installed into a door of a security enclosure, in accordance with another representative embodiment.

FIG. 8 is a cross-sectional view of a proportional torque shaft clutch assembly 110 and locking mechanism installed into a door 2 of a security enclosure, in accordance with another representative embodiment. Similar to the embodiment previously described, the shaft clutch assembly 110 includes a cam 30 for actuating a locking mechanism, and a clutch 112 comprising a sleeve body 140 and a collet 150. As stated above, however, in this configuration the distal end 114 of the sleeve body may be installed into the clutch assembly aperture 38 of the cam 30 with a integrally-threaded connection 115.

In this alternative configuration, moreover, the tapered sleeve journal 144 can be located proximate the proximal end 113 of the sleeve bore 142 opposite the cam, and the sleeve screw portion 146 with internal threads can be located opposite the sleeve journal and adjacent the cam 30. The collet nut 158 can be reduce in size so that the collet 150 can be inserted all the way through the sleeve bore 142 from the distal end 114 of the sleeve body 140, either before or after the sleeve body is attached to the cam 30.

Since the outer surface features of the collet 150 are configured to interface with the interior features of the sleeve bore 142, the collet journal 154 can be positioned between the collet nut 158 and the collet screw portion 156 with external threads which engage with the sleeve screw portion 146 located in the distal end of the sleeve bore 142. The collet journal includes an axial split 116 of about five degrees that allows the journal portion of the collet to be displaced inwardly when compressed against the sleeve journal. Moreover, the sleeve journal 144 and collet journal 154 can be tapered outwardly away from the axis of rotation 22 of the shaft 20 when traversing from a proximal end 113 to a distal end 114 of the clutch, and the applied assembly torque $T_A$ can operate to drive the collet 150 away from the cam 30 and against the sleeve journal 144, to compress the portion of the collet bore 152 directly underneath or adjacent to the collet journal 154/sleeve journal 144 interface located near the proximal end 113 of the clutch 112, and pinch or grip the cam end 26 of the shaft with a friction-fit gripping force that is proportional to the assembly torque $T_A$.

Figure 9:
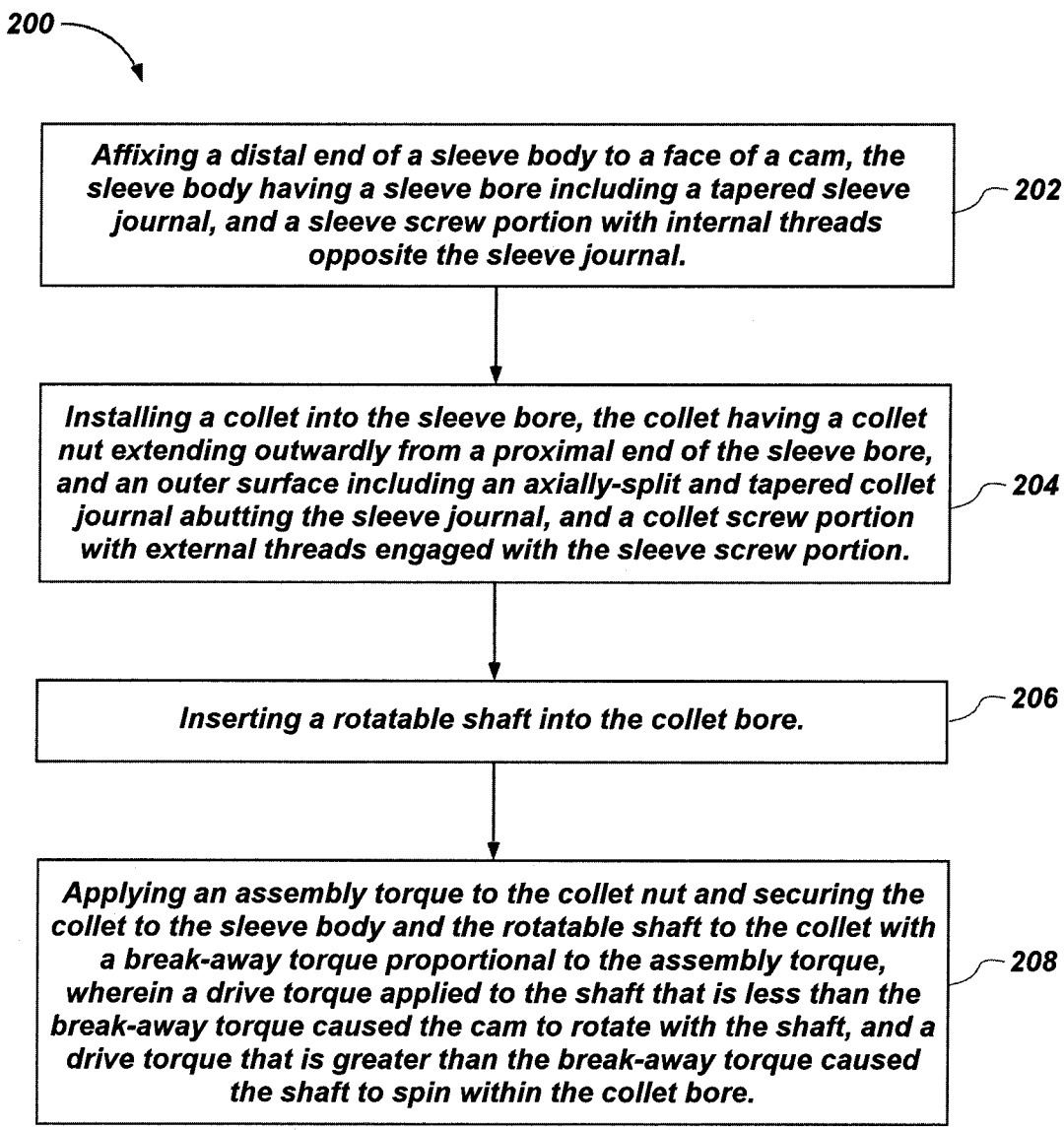
FIG. 9 is a flowchart depicting a method of securing a cam of a locking mechanism to a rotatable shaft, in accordance with yet another representative embodiment.

Illustrated in FIG. 9 is a flowchart depicting a method of securing a cam of a locking mechanism to a rotatable shaft, in accordance with yet another representative embodiment 200. The method 200 includes the step of affixing 202 a distal end of a sleeve body to a face of a cam, the sleeve body having a sleeve bore including a tapered sleeve journal, and a sleeve screw portion with internal threads opposite the sleeve journal. The method also includes the steps of installing 204 a collet into the sleeve bore, the collet having a collet nut extending outwardly from a proximal end of the sleeve bore, a collet bore, and an outer surface including an axially-split and tapered collet journal abutting the sleeve journal, and a collet screw portion with external threads engaged with the sleeve screw portion, and inserting 206 a rotatable shaft into the collet bore. The method further includes the step of applying 208 an assembly torque to the collet nut and securing the collet to the sleeve body and the rotatable shaft to the collet with a break-away torque proportional to the assembly torque, wherein a drive torque applied to the shaft that is less than the break-away torque causes the cam to rotate with the shaft, and a drive torque that is greater than the break-away torque causes the shaft to spin within the collet bore.

The foregoing detailed description describes the invention with reference to specific representative embodiments. However, it will be appreciated that various modifications and changes can be made without departing from the scope of the present invention as set forth in the appended claims. The detailed description and accompanying drawings are to be regarded as illustrative, rather than restrictive, and any such modifications or changes are intended to fall within the scope of the present invention as described and set forth herein.

What is claimed and desired to be secured by Letters Patent is:

1. A system for securing a cam of a locking mechanism to a rotatable shaft, comprising:
    a cam for actuating a locking mechanism;
    a proportional clutch comprising:
        a sleeve body having a distal end affixed to a face of the cam and a sleeve bore comprising:
            a tapered sleeve journal; and
            a sleeve screw portion with internal threads opposite the sleeve journal;
        a collet installed at least partially within the sleeve bore having a collet nut external to the sleeve bore and extending outwardly from a proximal end of the sleeve bore, a collet bore, and an outer surface comprising;
            tapered collet journal having an axial split extending through a distal end of the tapered collet journal, said tapered collet journal abutting the sleeve journal; and
            a collet screw portion with external threads engaged with the sleeve screw portion; and
    a rotatable shaft secured within the collet bore with a break-away torque proportional to an assembly torque applied to the collet nut,
    wherein a drive torque applied to the shaft that is less than the break-away torque causes the cam to rotate with the shaft, and a drive torque that is greater than the break-away torque causes the shaft to spin within the collet bore.

2. The system of claim 1, wherein the assembly torque applied to the collet nut forces the collet journal against the sleeve journal and compresses the axially-split collet bore around the rotatable shaft to create a friction fit between the collet bore and the rotatable shaft proportional to the assembly torque.

3. The system of claim 1, wherein the tapered sleeve journal is located proximate the distal end of the sleeve bore and adjacent the cam.

4. The system of claim 3, wherein the sleeve journal and collet journal are tapered inwardly towards a common centerline when traversing from a proximal end to a distal end of the clutch.

5. The system of claim 3, wherein the collet screw portion is positioned between the collet nut and the collet journal.

6. The system of claim 3, wherein the applied assembly torque moves the collet inwardly towards the cam and against the sleeve journal.

7. The system of claim 1, wherein the tapered sleeve journal is located proximate the proximal end of the sleeve bore opposite the cam.

8. The system of claim 7, wherein the collet journal is positioned between the collet nut and the collet screw portion.

9. The system of claim 7, wherein the applied assembly torque moves the collet outwardly away from the cam and against the sleeve journal.

10. The system of claim 7, wherein the sleeve journal and collet journal are tapered outwardly away from a common centerline when traversing from a proximal end to a distal end of the clutch.

11. The system of claim 1, further comprising a clutch aperture through the cam for receiving the distal end of the sleeve body therein.

12. The system of claim 11, wherein the rotatable shaft is inserted into the collet bore from a side of the cam opposite the proportional clutch.

13. The system of claim 1, further comprising a threaded opening through a sidewall of the sleeve body and configured to receive a set screw therein for locking the collet in a rotational position within the sleeve bore.

14. A system for securing a cam of a locking mechanism to a rotatable shaft, comprising:
  a cam for actuating a locking mechanism;
  a proportional clutch comprising:
    a sleeve body having a distal end affixed to a face of the cam and a sleeve bore comprising:
      a tapered sleeve journal adjacent the cam; and
      a sleeve screw portion with internal threads opposite the sleeve journal;
    a threaded collet inserted at least partially within the sleeve bore having a collet bore and an outer surface comprising:
      tapered collet journal having an axial split extending through a distal end of the tapered collet journal, said tapered collet journal abutting the sleeve journal;
      a collet nut opposite the collet journal external to and extending outwardly from a proximal end of the sleeve bore; and
      a collet screw portion with external threads between the collet nut and the collet journal and engaged with the sleeve screw portion; and
  a rotatable shaft secured within the collet bore with a break-away torque proportional to an assembly torque applied to the collet nut, and
  wherein a drive torque applied to the shaft that is less than the break-away torque causes the cam to rotate with the shaft, and a drive torque that is greater than the break-away torque causes the shaft to spin within the collet bore.

15. The system of claim 14, wherein the rotatable shaft is inserted into the collet bore from a side of the cam opposite the proportional clutch.

16. The system of claim 14, wherein the sleeve journal and collet journal are tapered inwardly towards a common centerline when traversing from the proximal end to the distal end of the clutch.

17. The system of claim 14, further comprising a threaded opening through a sidewall of the sleeve body and configured to receive a set screw therein for locking the collet to a rotational position within the sleeve bore.

18. A method for securing a cam of a locking mechanism to a rotatable shaft, comprising:
  affixing a distal end of a sleeve body to a face of the cam, the sleeve body having a sleeve bore including:
    a tapered sleeve journal; and
    a sleeve screw portion with internal threads opposite the sleeve journal;
  installing a collet into the sleeve bore, the collet having a collet nut being external to and extending outwardly from a proximal end of the sleeve bore, a collet bore, and an outer surface including:
    tapered collet journal having an axial split extending through a distal end of the tapered collet journal, said tapered collet journal abutting the sleeve journal; and
    a collet screw portion with external threads engaged with the sleeve screw portion;
  inserting a rotatable shaft into the collet bore; and
  applying an assembly torque to the collet nut and securing the collet to the sleeve body and the rotatable shaft to the collet with a break-away torque proportional to the assembly torque,
  wherein a drive torque applied to the shaft that is less than the break-away torque causes the cam to rotate with the shaft, and a drive torque that is greater than the break-away torque causes the shaft to spin within the collet bore.

19. The method of claim 18, further comprising tightening a set screw installed in a threaded opening through a sidewall of the sleeve and locking the collet in a rotational position within the sleeve.

20. The method of claim 18, wherein the rotatable shaft is inserted into the collet bore from a side of the cam opposite the proportional clutch.

* * * * *